US012586998B2

(12) United States Patent
Heitmeyer et al.

(10) Patent No.: US 12,586,998 B2
(45) Date of Patent: Mar. 24, 2026

(54) ELECTRICAL BOX WITH ADJUSTABLE MOUNTING SYSTEM

(71) Applicant: ALLIED MOULDED PRODUCTS, INC., Bryan, OH (US)

(72) Inventors: Charles Heitmeyer, Defiance, OH (US); Dustin Morr, Edon, OH (US)

(73) Assignee: ALLIED MOULDED PRODUCTS, INC., Bryan, OH (US)

( * ) Notice: Subject to any disclaimer, the term of this patent is extended or adjusted under 35 U.S.C. 154(b) by 172 days.

(21) Appl. No.: 18/601,443

(22) Filed: Mar. 11, 2024

(65) Prior Publication Data

US 2024/0322540 A1 Sep. 26, 2024

Related U.S. Application Data

(60) Provisional application No. 63/491,192, filed on Mar. 20, 2023.

(51) Int. Cl.
*H02G 3/12* (2006.01)

(52) U.S. Cl.
CPC ................................. *H02G 3/121* (2013.01)

(58) Field of Classification Search
None
See application file for complete search history.

(56) References Cited

U.S. PATENT DOCUMENTS 4,062,470 A * 12/1977 Boteler .................. H02G 3/125
220/3.9
4,605,139 A * 8/1986 Dacar ...................... H02G 3/12
174/57

4,747,506 A * 5/1988 Stuchlik, III .......... H02G 3/125
220/3.9
4,907,711 A * 3/1990 Stuchlik, III ............ H02G 3/12
220/3.4
5,171,939 A * 12/1992 Shotey ............... H01R 13/5213
174/67
5,243,134 A * 9/1993 Nattel ...................... H02G 3/16
174/505
5,253,831 A * 10/1993 Theodorides .......... H02G 3/126
248/225.11
5,289,934 A * 3/1994 Smith .................... H02G 3/126
220/3.9
6,956,172 B2 * 10/2005 Dinh ...................... H02G 3/125
174/53
6,979,780 B1 * 12/2005 Lalancette ............. H02G 3/121
174/64
7,179,994 B2 2/2007 Elberson
(Continued)

FOREIGN PATENT DOCUMENTS

JP 2015201398 A 11/2015

*Primary Examiner* — Krystal Robinson
(74) *Attorney, Agent, or Firm* — Shumaker, Loop & Kendrick, LLP; James D. Miller

(57) ABSTRACT

An electrical box assembly is disclosed including an electrical box having at least one sidewall, the sidewall including a channel formed therein to receive a threaded fastener. A mounting bracket is provided that is configured to be attached to a support member. The mounting bracket is operably engaged with the threaded fastener to facilitate an adjustment of the mounting bracket with respect to the electrical box, and consequently adjust the electrical box with respect to the support member.

18 Claims, 5 Drawing Sheets

(56)     References Cited

U.S. PATENT DOCUMENTS

| | | | | |
|---|---|---|---|---|
| 7,312,395 | B1 * | 12/2007 | Gretz | H02G 3/123 174/64 |
| 7,351,910 | B1 | 4/2008 | Magisano et al. | |
| 7,367,121 | B1 * | 5/2008 | Gorman | H02G 3/126 29/874 |
| 8,076,578 | B1 | 12/2011 | Gretz | |
| 8,710,367 | B2 * | 4/2014 | Korcz | H02G 3/086 174/559 |
| 9,966,746 | B1 * | 5/2018 | Ediger | H02G 3/126 |
| 10,756,522 | B2 | 8/2020 | Losaw | |
| 11,532,927 | B2 | 12/2022 | Ediger et al. | |
| 2003/0141092 | A1 * | 7/2003 | Petak | H02G 3/12 174/66 |
| 2005/0051546 | A1 | 3/2005 | Dinh | |
| 2006/0108362 | A1 * | 5/2006 | Lalancette | H02G 3/126 220/3.7 |
| 2008/0035363 | A1 * | 2/2008 | Yan | H02G 3/123 174/58 |
| 2011/0114382 | A1 * | 5/2011 | Laukhuf | H02G 3/126 174/520 |
| 2012/0305307 | A1 * | 12/2012 | Korcz | H02G 3/086 174/559 |
| 2020/0067296 | A1 | 2/2020 | Howard et al. | |
| 2020/0144800 | A1 * | 5/2020 | Liubakka | H02G 3/0616 |
| 2020/0144801 | A1 * | 5/2020 | Lloyd | H02G 3/086 |
| 2023/0066965 | A1 | 3/2023 | Yu | |
| 2024/0297487 | A1 * | 9/2024 | Heitmeyer | H02G 3/126 |
| 2025/0239842 | A1 * | 7/2025 | Korcz | H02G 3/081 |

* cited by examiner

ELECTRICAL BOX WITH ADJUSTABLE MOUNTING SYSTEM

CROSS-REFERENCE TO RELATED APPLICATION

This patent application claims priority to U.S. Provisional Patent Application Ser. No. 63/491,192, filed on Mar. 20, 2023, the entire disclosure of which is hereby incorporated herein by reference.

FIELD OF THE INVENTION

The present invention relates to an electrical box assembly, and more particularly, to an electrical box assembly having an adjustable mounting system including a bracket and an adjusting screw that facilitates a repositioning of the electrical box with respect to the bracket, and consequently a mounting structure or surface.

BACKGROUND OF THE INVENTION

Typically, an electrical box is used to support and contain electrical devices and wiring in a centralized space. The electrical box protects the wiring and electrical devices contained therein from extrinsic conditions such rain, snow, and fire, for example. A cover plate can be provided to further protect the wiring and electrical devices and militate against accidental contact with the wiring and devices. The electrical box is typically connected to a joist, a stud, or another structural component of a building acting as a mounting structure or surface.

Prior art electrical boxes include mounting systems with fastening devices that facilitate a connection to mounting structures. A common goal in installing electrical outlet boxes on interior walls is to install the front face of the box substantially flush with a wall surface. Conventional outlet boxes are typically fastened to a wall stud before the drywall is applied to the studs. As drywall is supplied in various thicknesses, it is difficult for the installer of the outlet boxes to position them correctly with respect to the eventual wall surface. If a repositioning of the electrical box is desired, the fastening devices must be completely removed from the mounting structure. The electrical box is then repositioned and the fastening devices re-fastened to the mounting structure. This typically requires the formation of additional apertures in the mounting structure. Further, the repositioning process can be time consuming.

To provide a means of adjusting the face of the outlet box substantially flush with the wall surface, adjustable outlet boxes have been proposed. The adjustable outlet boxes typically include a bracket and a mechanism for adjusting the face of the outlet box with respect to the wall surface.

Although several adjustable outlet boxes have been proposed, there is still a need for an adjustable outlet box that can be securely fastened to a stud. Additionally, brackets suggested by the prior art are typically of complex design, which increases the production costs thereof.

What is needed therefore is an adjustable electrical outlet box that is of simple design to enable it to be easily manufactured. Additionally, the adjustable outlet box should be capable of being securely fastened to a stud such that the box will not become loose from the supporting stud. These and other advantages can be realized with the adjustable outlet box proposed herein in the present invention.

Prior art adjustable outlet boxes are disclosed in U.S. Pat. Nos. 5,289,934; 7,312,395; 8,076,578; and 10,756,522, the entire disclosure of each of which is incorporated herein by reference.

It would be desirable to produce an electrical box assembly including a mounting system which facilitates a repositioning of the electrical box, wherein an case of repositioning the electrical box is maximized.

SUMMARY OF THE INVENTION

Consistent and consonant with the present invention, an electrical box assembly including a mounting system which facilitates a repositioning of the electrical box, wherein an case of repositioning the electrical box is maximized, has surprisingly been discovered.

In one embodiment, an electrical box assembly includes an electrical box having a sidewall and a front opening leading into an interior of the electrical box with the sidewall including a channel and a pair of opposing bracket-receiving openings formed therein. A bracket includes a pair of opposing wings formed thereon and at least one guide structure formed thereon with each of the wings is configured to be slidingly received in one of the opposing bracket-receiving openings. A threaded fastener is configured to be rotatably received in the channel and threadingly received in the at least one guide structure to selectively adjust a position of the bracket relative to the electrical box with respect to an axial direction of the threaded fastener.

BRIEF DESCRIPTION OF THE DRAWINGS

The above advantages of the invention will become readily apparent to those skilled in the art from reading the following detailed description of an embodiment of the invention in the light of the accompanying drawings, in which.

US 12,586,998 B2

3

Figures 1, 2, 3:
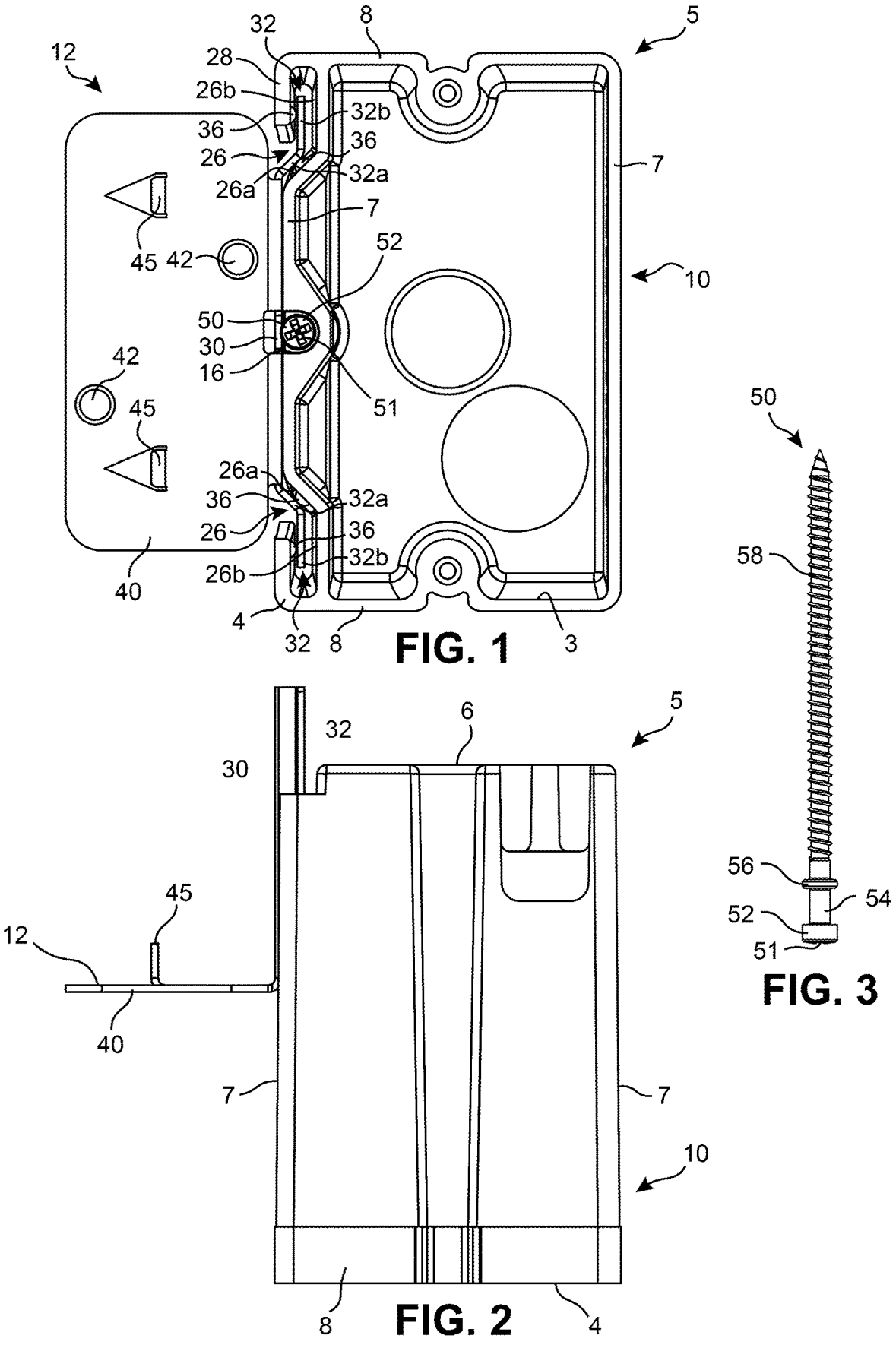
FIG. 1 is a front elevational view of an adjustable electrical box assembly according to an embodiment of the present invention.
FIG. 2 is a top plan view of the electrical box assembly of FIG. 1.
FIG. 3 is a top plan view showing a threaded fastener of the electrical box assembly of FIGS. 1 and 2 in isolation.
Figures 4, 5:
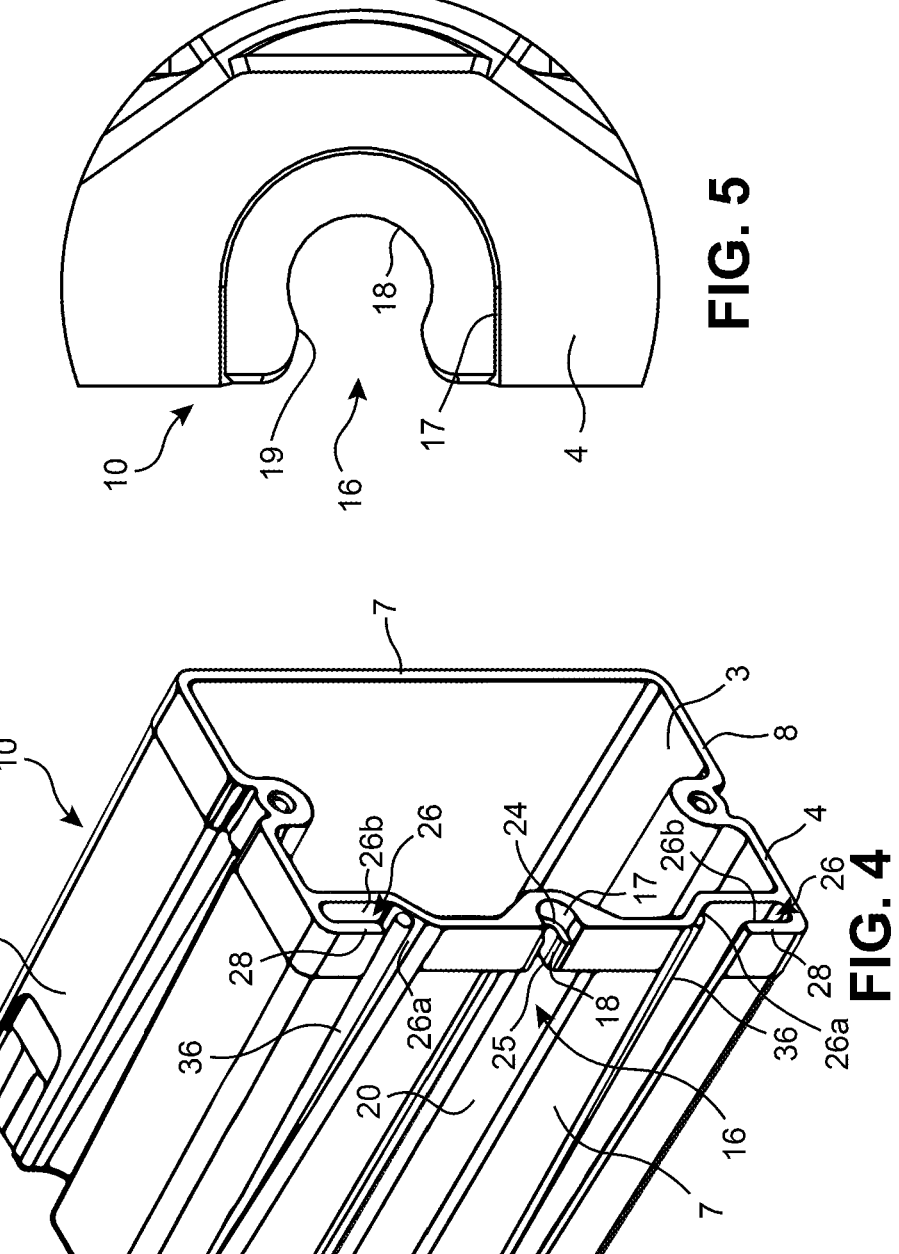
FIG. 4 is a front perspective view showing an electrical box of the electrical box assembly of FIGS. 1 and 2 in isolation.
FIG. 5 is a fragmentary front elevational view of a portion of the electrical box of FIG. 4 showing a channel formed in the electrical box.

DETAILED DESCRIPTION OF THE
PREFERRED EMBODIMENT

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-9 illustrate an electrical box assembly 5 according to an embodiment of the present invention. The electrical box assembly 5 includes an electrical box 10, a bracket 12 slidably engaging the electrical box 10, and a threaded fastener 50 configured to operably engage the bracket 12 to adjust a position of the bracket 12 relative to the electrical box 10. The electrical box assembly 5 is adjustable to accommodate varying wall thicknesses, as may occur when a wall structure housing the electrical box assembly 5 includes multiple layers or a non-standard thickness, such that the electrical box 10 may be desirably positioned relative to an outer and exposed surface of the corresponding wall structure.

The threaded fastener 50 (shown in isolation in FIG. 3) includes, with respect to an axial direction of the threaded fastener 50, a head 52, a substantially cylindrical portion 54, a flange or shoulder 56, and a threaded portion 58. The head 52 is formed at a first end of the fastener 50 and includes a tool indentation 51 formed in an axial end thereof, wherein the tool indentation 51 is configured to receive a rotational tool (not shown) therein for rotating the threaded fastener about a central longitudinal axis thereof, such as receiving the operational end of a screw driver or similar tool. The cylindrical portion 54 is formed between the head 52 and the flange 56 and includes a reduced diameter in comparison to each of the head 52 and the flange 56. The threaded portion 58 extends from adjacent the flange 56 to a second end of the fastener 50 and also includes a reduced diameter in comparison to each of the head 52 and the flange 56. More specifically, a thread of the threaded portion 58 includes a maximum outer diameter that is less than an outer diameter of either of the head 52 or the flange 56.

The electrical box 10 includes a back wall 6, a pair of opposing sidewalls 7, and a pair of opposing end walls 8, which cooperate to define a hollow interior space of the electrical box 10 having a front opening 3 permitting access to the interior space at a front 4 of the electrical box 10, wherein the front 4 forms a surface of the electrical box 10 arranged opposite the back wall 6 thereof. As shown, the electrical box 10 is formed as a unitary structure. However, the electrical box 10 can be formed from independent parts assembled together without necessarily departing from the scope of the present invention. Further, the electrical box 10 shown is formed from a molding process, although other forming processes can be used, as desired. The electrical box 10 may be produced from a fiberglass-reinforced polyester, although other materials can be used, as desired. The electrical box 10 may include knock-outs, doors, or the like for introducing electrical components into the interior of the electrical box 10. The electrical box 10 further includes structure for mounting additional structure to the electrical box 10, such as coupling features for mounting an outlet cover or the like to the front 4 of the electrical box 10, as desired.

Figure 8:
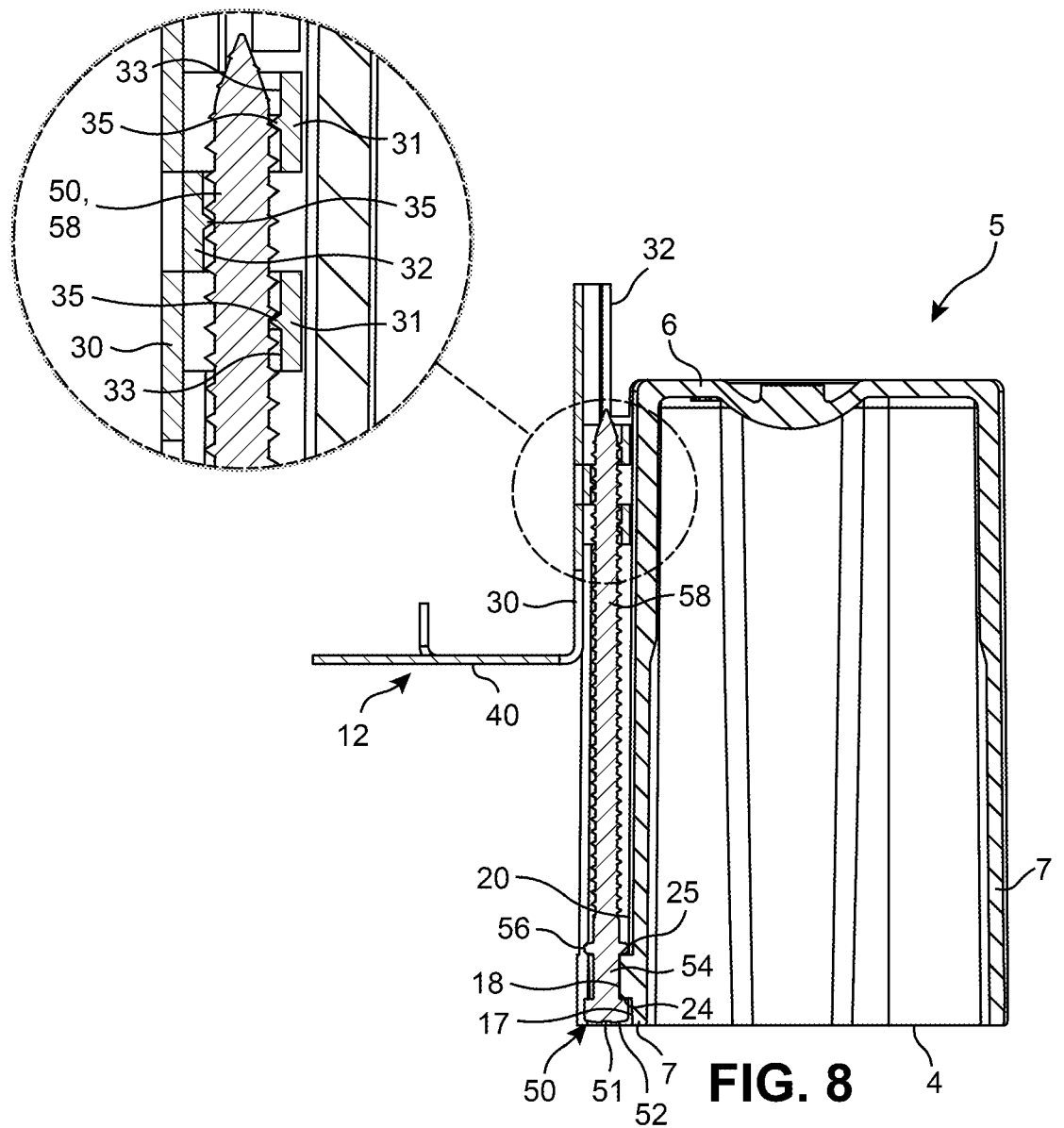
FIG. 8 is a cross-sectional view taken through a central plane of the threaded fastener of the electrical box assembly.
Figure 9:
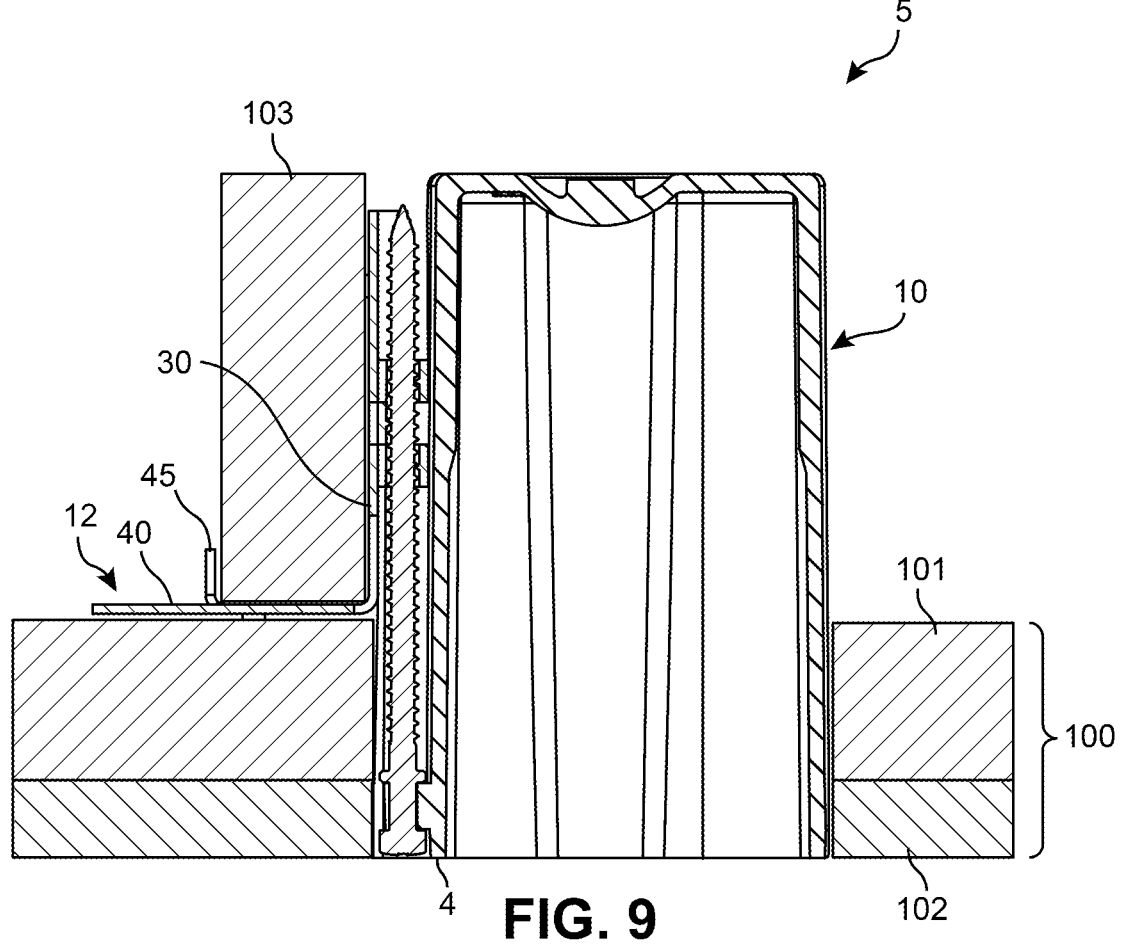
FIG. 9 is a cross-sectional view showing an adjustment of the electrical box assembly from the configuration of FIG. 8 with the electrical box assembly installed relative to an exemplary wall structure and support structure.

A channel 16 is formed in one of the opposing sidewalls 7 of the electrical box 10 and is configured to receive at least a portion of the threaded fastener 50 therein during operational use of the electrical box assembly 5, as best shown in FIGS. 8 and 9. The channel 16 is provided as a laterally extending indentation formed in an outer surface of the corresponding one of the sidewalls 7 that is indented in a direction towards the interior space of the electrical box 10 (and towards the opposing one of the sidewalls 7 disposed opposite the channel 16). As used hereinafter, the lateral direction refers to a direction extending between the opposing sidewalls 7, which may be a horizontal direction in accordance with an installed orientation of the electrical box assembly 5 according to the present embodiment. The channel 16 further extends from the front 4 of the electrical box 10 and towards the back wall 6 with respect to an axial direction of the electrical box assembly 5 arranged perpendicular to the described lateral direction, and may extend along an entirety of an axial dimension of the electrical box 10 from the front 4 to the rearward surface of the back wall 6, as desired. The axial direction may also be a horizontal direction according to the installed orientation of the electrical box assembly 5 as disclosed herein. The channel 16 includes a varying configuration (cross-sectional shape) when extending rearwardly from the front 4 towards the back wall 6 and includes, with respect to the rearwardly extending axial direction, a first portion 17, a second portion 18, and a third portion 20.

The first portion 17 of the channel 16 is formed at the front 4 of the electrical box 5 and includes a cross-section having a combination of a laterally inwardly disposed semi-circular portion and a laterally outwardly disposed rectangular portion leading into the semi-circular portion. The first portion 17 is dimensioned to receive the head 52 of the threaded fastener 50 therein during a lateral movement of the head 52 into the first portion 17 of the channel 16, and is further dimensioned to allow for rotation of the head 52 about the central axis of the threaded fastener 50 when received within the first portion 17. The cross-sectional shape of the first portion 17 may be considered to be a truncated stadium shape having only one semi-circular portion disposed at the end of the corresponding rectangular portion.

The second portion 18 of the channel 16 is formed immediately rearwardly of the first portion 17 thereof and includes a cross-section having a cylindrical shape arranged concentrically relative to the semi-circular portion of the cross-section of the first portion 17, thereby allowing for the cylindrically shaped threaded fastener 50 to be axially received through each of the first portion 17 and the second portion 18. The cylindrical shape formed by the second portion 18 includes a diameter that is less than a diameter of the first portion 17 to cause a front-facing surface of the second portion 18 to form a first shoulder 24 where the channel 16 reduces in cross-section from the first portion 17 to the second portion 18. The cylindrical shape of the second portion 18 forms a circular arc that extends through greater than 180° of angular displacement relative to a central axis of the cylindrical shape to cause the second portion 18 to include a mouth 19 having a reduced dimension in comparison to a distance between diametrically opposing sides of the circular arc. The mouth 19 is selected to have a slightly smaller dimension than the cylindrical portion 54 of the threaded fastener 50 while the circular arc includes a diameter slightly greater than that of the cylindrical portion 54. The mouth accordingly 19 allows for the lateral entry of the cylindrical portion 54 of the threaded fastener 50 into the second portion 18 of the channel 16 in a snap-fit manner that facilitates a removable coupling of the threaded fastener 50 to the electrical box 10 and the ability to rotate the cylindrical portion 54 within and relative to the second portion 18 of the channel 16.

The third portion 20 is formed immediately rearwardly of the second portion 18 and includes an enlarged cross-section relative thereto to cause the channel 16 to enlarge when progressing rearwardly from the second portion 18. This enlargement of the channel 16 at the transition to the third portion 20 results in a rearward facing surface of the second portion 18 forming a second shoulder 25. The third portion 20 may have substantially any cross-sectional shape so long as the second shoulder 25 is formed at the transition of the channel 16 from the second to third portions 18, 20, and so long as the threaded portion 58 of the threaded fastener 50 is receivable within the third portion 20 without intruding upon the electrical box 10 or interfering with operation of the bracket 12.

At least one bracket-receiving opening 26 is formed on the electrical box 10 on the same one of the opposing sidewalls 7 as the channel 16. The present embodiment includes a pair of the bracket-receiving openings 26 with each of the bracket-receiving openings 26 respectfully formed adjacent one of the opposing end walls 8 of the electrical box 10, although it is understood that the bracket-receiving openings 26 can be formed at intermediate locations on the one of the opposing sidewalls 7, as desired, so long as the bracket 12 engages the bracket-receiving openings 26 in a guiding fashion as described herein. The bracket-receiving openings 26 are positioned on the one of the sidewalls 7 to opposing sides of the channel 16 with respect to a height direction of the electrical box 10 extending between the opposing end walls 8 thereof, wherein the height direction is perpendicular to each of the lateral direction and the axial direction. In the embodiment shown, each of the bracket-receiving openings 26 extends uninterrupted from the front 4 of the electrical box 10 and through the rearward surface of the back wall 6 thereof. However, it is understood that the bracket-receiving openings 26 can have a length shorter than a length from the front 4 to the back wall 6, and thus be spaced from one or both of the front 4 and the back wall 6, without necessarily departing from the scope of the present invention.

Each of the bracket-receiving openings 26 is open in a direction towards the centrally disposed channel 16 and includes a first segment 26a and a second segment 26b, wherein each of the segments 26a, 26b extends axially along the length of the corresponding bracket-receiving opening 26. The first segment 26a extends from the open portion of the corresponding bracket-receiving opening 26 towards the second segment 26b and the second segment 26b extends away from the first segment 26a and forms an inwardly disposed and vertically outward end of each of the respective bracket-receiving openings 26. As used herein, a height direction of the electrical box assembly 5 refers to a direction extending between the opposing end walls 8 of the electrical box 10 and is arranged perpendicular to each of the axial direction and the lateral direction thereof. The height direction may be a vertical direction according to the installed orientation of the electrical box assembly 5. As used hereinafter, references to vertically extending features of the electrical box assembly 5 refer to those features extending in the described height direction of the electrical box assembly 5. The first segment 26a extends laterally inwardly towards the interior space of the electrical box 10 (towards the opposing one of the sidewalls 7 not having the channel 16 and bracket-receiving openings 26 formed therein) and then vertically outwardly towards a corresponding one of the end walls 8 to cause the first segment 26a of each of the bracket-receiving openings 26 to be arranged at an incline with respect to the lateral and vertical directions of the electrical box 10. Specifically, at least an outer surface of the one of the sidewalls 7 defining an inner disposed and outwardly facing surface of the corresponding bracket-receiving opening 26 (facing away from the interior of the electrical box 10) includes a surface inclined with respect to the lateral and vertical directions. The second segment 26b extends in the vertical direction away from the corresponding first segment 26a and towards the adjacent one of the end walls 8. Specifically, at least the outer surface of the one of the sidewalls 7 defining the corresponding bracket-receiving opening 26 includes a surface extending exclusively in the vertical direction away from the inclined surface of the first segment 26a.

The manner in which each of the bracket-receiving openings 26 extends at least partially laterally inwardly towards the interior of the electrical box 10 and then vertically outwardly towards the adjacent one of the end walls 8 results in the formation of a flanged portion 28 of the one of the sidewalls 7 that forms an outer disposed and inwardly facing surface defining at least a portion of the corresponding bracket-receiving opening 26. That is, each of the bracket-receiving openings 26 is formed as an open space disposed between an inner disposed and outwardly facing surface of the one of the sidewalls 7 and an outwardly disposed and inwardly facing surface of the corresponding one of the flanged portions 28. In the provided embodiment, each of the flanged portions 28 defines a vertically extending and inwardly facing surface along the second segment 26b of the corresponding bracket-receiving opening 26, thereby resulting in the flanged portion 28 being devoid of an inclined surface opposing that of the first segment 26a. However, in some embodiments, the flanged portion 28 may further define an inwardly facing surface having an incline similar to or matching that of the incline of the one of the sidewalls 7 along the first segment 26a, as desired, without necessarily departing from the scope of the present invention.

A surface of the electrical box 10 defining each of the respective bracket-receiving openings 26 further includes a pair of protuberances 36 or interference guides 36 projecting therefrom for aiding in locating and guiding the bracket 12 relative to the electrical box 10. Specifically, a surface of the corresponding sidewall 7 defining a corresponding one of the bracket-receiving openings 26 includes a first one of the protuberances 36 projecting outwardly and away from the interior space of the electrical box 10 along an outward facing portion of the first segment 26a thereof and a second one of the protuberances 36 projecting inwardly towards the interior space along an inward facing portion of the second segment 26b, which corresponds to the inwardly facing surface of the corresponding flanged portion 28. Each of the protuberances 36 further extends in the axial direction of the electrical box 10 from the front 4 to the back wall 6 thereof with each of the protuberances 36 extending substantially in parallel to the direction of axial extension of the corresponding bracket-receiving opening 26 into which each pair of the protuberances 36 protrudes. However, each of the protuberances 36 may be provided to extend along only a portion of the axial length of the corresponding one of the sidewalls 7 and may thus be spaced from one or both of the front 4 and the back wall 6. Further as shown, the protuberances 36 have a generally arcuate cross-sectional shape when projecting away from the corresponding surface, although other shapes can be used, as desired. One or both of the axial ends of each of the protuberances 36 may be tapered to aid in piloting an end of a corresponding one of the wings 32 of the bracket 12 therein when initially entering the bracket-receiving openings 26. In the illustrated embodiment, the tapered end may be formed by a quarter-sphere shape that transitions to the arcuate cross-sectional shape of each of the protuberances 36, although other tapered shapes may be utilized in piloting the wings 32. In the embodiment shown, the protuberances 36 extend from a position immediately adjacent the front 4 of the electrical box 10 to a position immediately adjacent the back wall 6 of the electrical box 10.

The bracket 12 may be produced from a plated carbon steel, although other materials can be used, as desired. The bracket 12 includes a main body 30 which is substantially planar and plate-like in configuration. A wing 32 (also referred to as a stepped portion 32) extends from each of the opposing ends of the main body 30 corresponding to the vertically upper and lower ends of the main body 30 when the bracket 12 is operatively engaging the electrical box 10. Each of the wings 32 is configured to be slidably received in one of the bracket-receiving openings 26 of the electrical box 10 during operational use of the electrical box assembly 5. Each of the wings 32 includes an inclined portion 32a extending from the respective upper or lower end of the main body 30 and an offset portion 32b extending from an end of the inclined portion 32a formed distally relative to the main body 30. When the bracket 12 operatively engages the electrical box 10, the inclined portion 32a of each of the wings 32 is disposed at an incline with respect to each of the lateral direction and the vertical direction while the offset portion 32b of each of the wings 32 is arranged in the vertical direction in parallel to the main body 30. Each of the inclined portions 32a may include an incline substantially similar to or the same as the incline of the first segment 26a of the corresponding one of the bracket-receiving openings 26. The offset portions 32b of the wings 32 may be arranged coplanar with each other and are offset laterally from the plane of the main body 30 as a result of the extension of the inclined portions 32a away from the main body 30.

The main body 30 of the bracket 12 further includes a plurality of guide structures 31, 34 for guiding the axial motion of the threaded fastener 50 relative to the bracket 12 during operational use of the electrical box assembly 5. The guide structures 31, 34 of the present embodiment include a pair of first guide structures 31 with each of the first guide structures 31 engaging the threaded portion 58 of the threaded fastener 50 to a first diametric side thereof and a second guide structure 34 engaging the threaded portion 58 to a second diametric side thereof opposite the first diametric side. The guide structures 31, 34 project away from a surface of the main body 30 facing towards the sidewall 7 of the electrical box 10 having the channel 16 and the bracket-receiving openings 26 formed therein. The first guide structures 31 are positioned axially to either axial side of the second guide structure 34 to result in an alternating configuration of the first and second guide structures 31, 34 when progressing in the axial direction of the electrical box assembly 5.

Each of the first guide structures 31 is formed as a strip of the main body 30 extending laterally outwardly away from the plane of the remainder of the main body 30 in a substantially triangular shape for forming an aperture 33 extending around and receiving the threaded portion 58 of the threaded fastener 50 therein. The aperture 33 formed by each of the respective first guide structures 31 includes a cylindrically shaped surface at a laterally inward side thereof where the legs of the triangular shape meet at a position disposed distally from the plane of the main body 30, wherein each of the apertures 33 is configured to receive the threaded portion 58 therethrough for guiding axial movement of the threaded fastener 50.

Figures 6, 7:
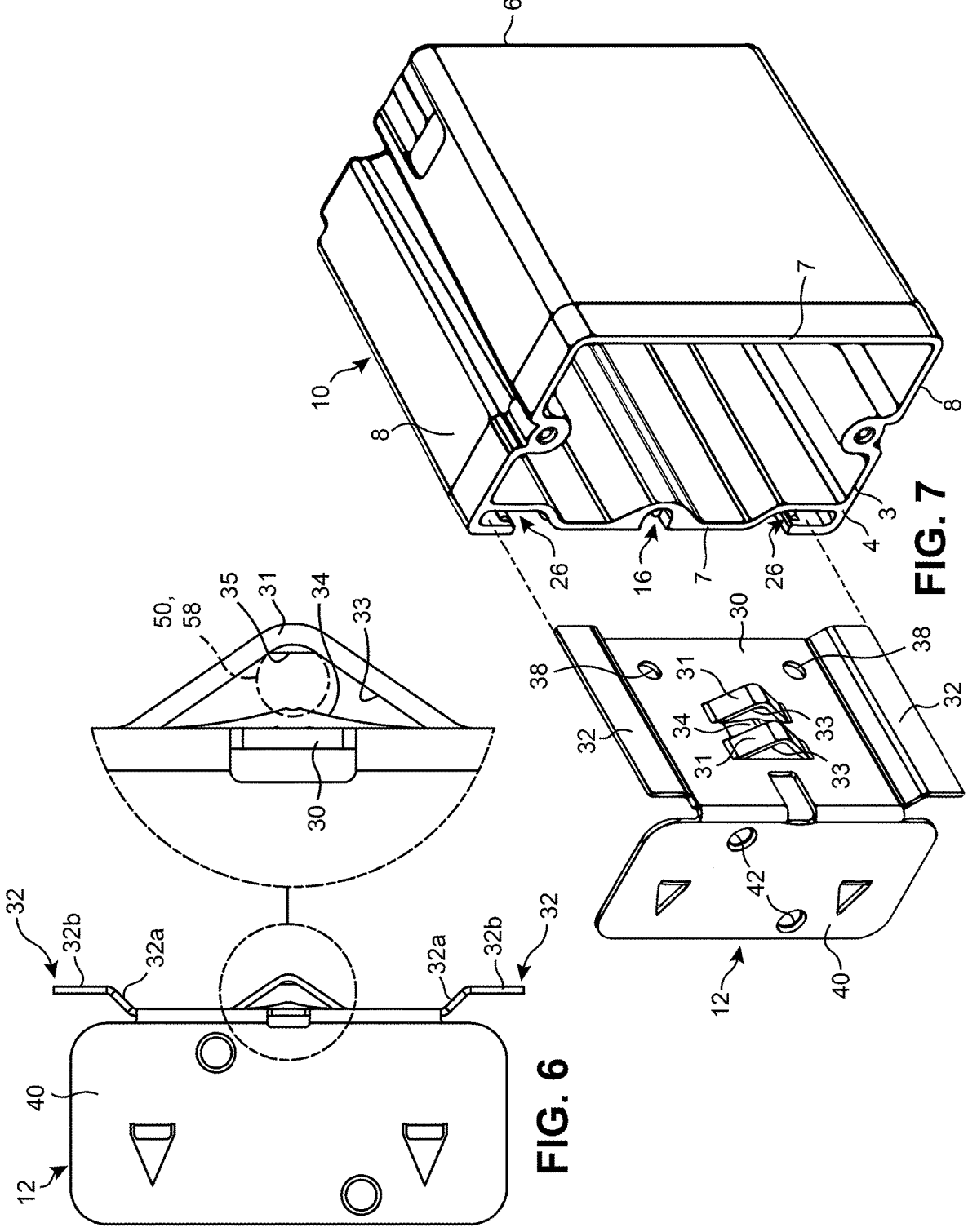
FIG. 6 is a front elevational view showing a bracket of the electrical box assembly of FIGS. 1 and 2 in isolation with an enlarged view of an encircled portion of the bracket having guide structures for guiding a threaded fastener of the electrical box assembly.
FIG. 7 is a front perspective view of the electrical box and the bracket showing the manner in which the bracket is slidably received within openings formed in the electrical box.

The second guide structure 34 is also a triangular strip of the main body 30 extending laterally outwardly away from the plane of the remainder of the main body 30 in similar fashion to each of the first guide structures 31, but the second guide structure 34 projects away from the plane of the main body 30 by a smaller lateral distance than each of the first guide structures 31 to position the second guide structure 34 to the opposing diametric side of the threaded fastener 50 in comparison to each of the first guides 31. The threaded portion 58 of the threaded fastener 50 is axially receivably through each of the apertures 33 of the first guide structures 31 and along the exposed surface of the second guide structure 34 to constrain the threaded portion 58 to move only axially relative to the bracket 12. FIG. 6, which includes an enlarged view of the first and second guide structures 31, 34, illustrates the threaded fastener 50 in broken line format to show the manner in which the threaded portion 58 thereof may be received between the diametrically opposing surfaces of the first and second guide structures 31, 34 to constrain the threaded fastener 50 to move axially along the central axis thereof, which coincides with the axial direction of the electrical box assembly 5 when the threaded fastener 50 is operatively engaging the electrical box 10 and the bracket 12.

As shown in FIGS. 6 and 8, at least one thread engaging projection 35 may project from a facing surface of one or more of the guide structures 31, 34 for engaging the thread of the threaded portion 58 of the fastener 50. Specifically, one or both of the first guide structures 31 may include one of the thread engaging projections 35 disposed along the cylindrically shaped surface thereof for engaging the first diametric side of the threaded portion 58 and the second guide structure 34 may include one of the thread engaging projections 35 disposed along a distal surface of the second guide structure 34 for engaging the second diametric side of the threaded portion 58. Each of the thread engaging projections 35 is configured to be receivable between adjacent and axially spaced apart segments of the thread of the threaded portion 58 such that rotation of the threaded fastener 50 about the central axis thereof results in an axial pushing of each of the thread engaging projections 35 in a forward or rearward axial direction, depending on the direction of rotation of the threaded fastener (clockwise or counterclockwise). In the example shown in FIG. 8, each of the guide structures 31, 34 includes one of the thread engaging projections 35, but it should be apparent that fewer or more of the thread engaging portions 35 may be utilized while remaining within the scope of the present invention, including the use of only a single one of the thread engaging projections 35 on only one of the guide structures 31, 34.

The main body 30 may include one or more apertures 38 to facilitate insertion of fasteners (not shown) to couple the main body 30 to a support structure such as a joist, a stud, or another structural component of a building acting as a mounting structure or surface. The main body 30 may include any configuration and number of the apertures 38 for establishing a desired coupling of the bracket 12 to the corresponding support structure.

In some embodiments, an angled body 40 extends from the main body 30, wherein the angled body 40 may be provided as a substantially planar and plate-like structure. The main body 30 and the angled body 40 may be formed from a single piece of material, although the main body 30 and the angled body 40 can be formed from separate pieces of material and coupled to each other by any known fastening method, as desired. If formed from a single piece of material, the bracket 12 may be formed as a planar blank arranged on the plane of the main body 30, and may be subsequently bent to form the bracket 12 as shown throughout the figures. Specifically, the angled body 40 may be provided to extend from an axial end of the main body 30 disposed towards the front 4 of the electrical box 10. Further, in the embodiment shown, an angle of 90 degrees is formed between the main body 30 and the angled body 40, although other angles can be provided to accommodate differing mounting configurations.

Apertures 42 may be provided in the angled body 40 to facilitate insertion of fasteners (not shown) to couple the angled body 40 to a support structure such as a joist, a stud, or another structural component of a building acting as a mounting structure or surface. The angled body 40 may include any configuration and number of the apertures 38 for establishing a desired coupling of the bracket 12 to the corresponding support structure.

The angled body 40 may further include at least one bendable tab 45 that is able to be bent from a configuration wherein the bendable tab 45 is arranged co-planar to the plane of the angled body 40 to a configuration wherein the bendable tab 45 is arranged transverse relative to the plane of the angled body 40, such as being arranged perpendicular relative to the plane of the angled body 40. Each of the tabs 45 may be disposed at a distance from the main body 30 sufficient for receiving the support structure to which the bracket 12 is coupled between a face of each of the tabs 45 and the facing surface of the main body 30. That is, the support structure, such as a stud, joist, etc., may be sand-wiched between each of the bent tabs 45 and the main body 30. However, the bendable tabs 45 may be maintained in the parallel and co-planar configuration (absent bending) where the corresponding support structure would otherwise inter-fere with the angled body 40, such as a support structure having a relevant dimension greater than a distance present between a base of each of the bendable tabs 45 and the main body 30 such that a sandwiching of the support structure is not readily achievable.

To assemble the electrical box assembly 5, the cylindrical portion 54 of the threaded fastener 50 is snapped into the relatively narrow second portion 18 of the channel 16 with the head 52 received within the first portion 17 thereof and the threaded portion 58 received within the third portion 20 thereof. The wings 32 of the main body 30 of the bracket 12 are then inserted into the bracket-receiving openings 26 of the electrical box 10, which may include the wings 32 entering the bracket-receiving openings 26 in a forward axial direction with the wings 32 at the rear wall 6 of the electrical box 10 such that the bracket 12 is slid axially towards the opposing front 4 of the electrical box 10. The bracket 12 can then be slid towards the fastener 50 until the second end thereof including the threaded portion 58 is received into a first one of the guide structures 31, 34, which in the present embodiment includes the threaded portion 58 passing through one of the apertures 33 defined by a corresponding one of the first guide structures 31.

During and after insertion of the bracket 12 into the bracket-receiving openings 26 of the electrical box 10, the protuberances 36 abut a surface of the bracket 12. Thus, the protuberances 36 ensure a snug fit between the electrical box 10 and the bracket 12. The snug fits helps minimize any relative movement between the electrical box 10 and the bracket 12, which helps minimize and noise, damage, or wobble. More specifically, as best shown in FIG. 1, the laterally inward facing protuberance 36 formed along the second segment 26b on the flanged portion 28 of the corresponding one of the bracket-receiving openings 26 engages the offset portion 32b of the corresponding wing 32 along a laterally outward facing surface thereof while the laterally outward facing protuberance 36 formed along the first segment 26a on the corresponding sidewall 7 engages the inclined portion 32a of the corresponding wing 32 along a laterally inward facing surface thereof. The engagement of each of the wings 32 with oppositely arranged ones of the protuberances 36 may result in a partial and substantially elastic bending/deformation of one or both of the bracket 12 or the electrical box 10 adjacent the engaging surfaces to ensure the previously described snug fit due to the increased friction generated by the tight fit of the corresponding wing 32 between the opposing protuberances 36.

The threaded fastener 50 is then rotated to threadingly engage the thread engaging projections 35 formed on one or more of the guide structures 31, 34 and/or the main body 30 of the bracket 12 to further slide the bracket 12 to a desired axial position with respect to the electrical box 10. In embodiments without the angled body 40, the main body 30 is coupled to the structural support. In the embodiments including the angled body 40, the angled body 40 can be coupled to the structural support in addition to or in place of the main body 30. Further adjustment to the position of the electrical box 10 with respect to the bracket 12 and the corresponding structural support can be made as desired to ensure proper positioning and alignment with the structural support or other structures such as dry wall or other building materials. Accordingly, the electrical box assembly 5 includes a mounting system which facilitates repositioning of the electrical box 10, wherein an ease of repositioning the electrical box 10 is maximized.

FIG. 9 illustrates one exemplary and non-limiting use of the electrical box assembly 5 wherein an adjustment of the axial position of the electrical box 10 relative to the bracket 12 may be desirable. The provided example includes a wall structure 100 comprising an inner layer 101 and an outer layer 102 stacked upon one another, wherein each of the layers 101, 102 may be representative of any form of building material suitable for forming the wall structure. In one non-limiting example, the inner layer 101 is a layer of drywall while the outer layer 102 is a layer of paneling or the like disposed on the inner layer 101. The addition of the outer layer 102 to the inner layer 101, which may result in a non-standard thickness of the resulting wall structure, may result in the need to adjust the electrical box 10 to bring the front 4 of the electrical box 10 to a position adjacent or flush to the exposed surface of the outer layer 102.

In the provided example, the bracket 12 is disposed at a position wherein the bracket 12 may be coupled to the corresponding support structure 103, which may be repre-sentative of a stud 103 associated with the wall structure 100, via the passage of fasteners through the apertures 38, 42 of either of the main body 30 or the angled body 40 (or both), each of which may be positioned immediately adja-cent or in contact with a corresponding side surface of the support structure 103. Additionally, the support structure 103 is shown as being disposed laterally between the main body 30 of the bracket 12 and the at least one bendable tab 45 when the at least one tab 45 is bent perpendicular to the plane of the angled body 40 and in parallel to the plane of the main body 30. It can be seen by a comparison of FIG. 8 to FIG. 9 that the bracket 12 has been adjusted to move axially towards the front 4 of the electrical box 10 until a distance between the angled body 40 of the bracket 12 and the front 4 of the electrical box 10 is substantially equal to a thickness of the combined wall structure 100 comprising the inner and outer layers 101, 102, thereby aligning the front 4 of the electrical box 10 with the exposed surface of the wall structure 100 formed by the outermost surface of the outer layer 102.

It should be readily apparent to one skilled in the art that the disclosed electrical box assembly 5 may be installed relative to a wall structure and corresponding support struc-ture having substantially any orientation, such as forming a floor structure or ceiling structure, as desired. Such configu-rations may include the axial direction of the electrical box assembly 5 being vertically arranged while the lateral and height directions thereof are arranged horizontally. It should also be apparent that the electrical box assembly 5 need not be installed when in the disclosed upright orientation, and may be rotated to accommodate any desired installation configuration. For example, the electrical box assembly 5 may be installed relative to a horizontally extending support structure with the described height direction horizontally arranged and the described lateral direction vertically arranged. The illustrated orientation of the electrical box assembly 5 is thus non-limiting.

The bracket 12 as disclosed herein may be manufactured from a substantially planar and plate-like blank (not shown) having the guide structures 31, 34 projecting from an inboard region thereof, wherein the wings 32 and the angled body 40 are formed by bending peripheral portions of the blank to the disclosed configuration. Specifically, the angled body 40 may be bent to a desired angle relative to the main body 30 along one bend region and each of the wings 32 may be bent twice along two spaced apart bend regions to form the inclined and offset portions 32*a*, 32*b* thereof. The described bendable tabs 45 may also be initially disposed on the plane of the blank and may be bent away therefrom along respective bend regions thereof. However, the bracket 12 may be formed into the disclosed configuration utilizing alternative methods, as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box assembly comprising:
   an electrical box having a sidewall and a front opening leading into an interior of the electrical box, the sidewall including a channel and a pair of opposing bracket-receiving openings formed therein;
   a bracket including a pair of opposing wings formed thereon and at least one guide structure formed thereon, each of the wings configured to be slidingly received in one of the opposing bracket-receiving openings; and
   a threaded fastener configured to be rotatably received in the channel and threadingly received in the at least one guide structure to selectively adjust a position of the bracket relative to the electrical box with respect to an axial direction of the threaded fastener, wherein each of the wings is formed at one of a pair of opposing ends of a main body of the bracket, and wherein each of the wings of the bracket includes an inclined portion extending from the main body and an offset portion extending from the inclined portion, wherein a first protuberance projecting from the electrical box frictionally engages an outwardly facing surface of the offset portion of a corresponding one of the wings and a second protuberance projecting from the electrical box frictionally engages an inwardly facing surface of the inclined portion of the corresponding one of the wings.

2. The electrical box assembly of claim 1, wherein the inclined portion of each of the wings is arranged transversely relative to the main body and the offset portion of each of the wings is offset from the main body.

3. The electrical box assembly of claim 2, wherein the inclined portion of each of the wings is inclined in a lateral direction arranged perpendicular to the axial direction and towards the interior of the electrical box, and wherein the offset portion of each of the wings is offset from the main body with respect to the lateral direction.

4. The electrical box assembly of claim 1, wherein the bracket includes a main body arranged on a plane parallel to the axial direction and an angled body arranged transverse to the axial direction.

5. The electrical box assembly of claim 4, wherein the angled body is arranged perpendicular to the axial direction.

6. The electrical box assembly of claim 4, wherein one or both of the main body and the angled body includes at least aperture configured to receive a fastener for coupling the bracket to a support structure.

7. The electrical box assembly of claim 4, wherein the angled body includes at least one bendable tab formed therein.

8. The electrical box assembly of claim 7, wherein the at least one bendable tab is configured to be bent away from a plane of the angled body to be arranged in parallel to a plane of the main body.

9. The electrical box assembly of claim 1, wherein the threaded fastener does not move axially relative to the electrical box during rotation thereof.

10. The electrical box assembly of claim 9, wherein a first shoulder of the channel prevents movement of the threaded fastener in the axial direction towards a front of the electrical box and a second shoulder of the channel prevents movement of the threaded fastener in the axial direction away from the front of the electrical box during rotation of the threaded fastener.

11. The electrical box assembly of claim 9, wherein the threaded fastener includes a head, a cylindrical portion, a flange, and a threaded portion when progressing in the axial direction away from a front of the electrical box, wherein the cylindrical portion of the threaded fastener is snap-fit into a portion of the channel.

12. The electrical box assembly of claim 1, wherein the at least one guide structure is provided as a strip extending away from a main body of the bracket with an inner surface of the strip defining an aperture through which the threaded fastener is threadingly received.

13. The electrical box assembly of claim 12, wherein at least one thread-engaging projection projects from the inner surface of the strip to threadingly engage a threaded portion of the threaded fastener.

14. An electrical box assembly comprising:
   an electrical box having a sidewall and a front opening leading into an interior of the electrical box, the sidewall including a channel and a pair of opposing bracket-receiving openings formed therein;
   a bracket including a pair of opposing wings formed thereon and at least one guide structure formed thereon, each of the wings configured to be slidingly received in one of the opposing bracket-receiving openings; and
   a threaded fastener configured to be rotatably received in the channel and threadingly received in the at least one guide structure to selectively adjust a position of the bracket relative to the electrical box with respect to an axial direction of the threaded fastener, wherein each of the bracket-receiving openings is defined by a surface of the electrical box having at least one protuberance projecting therefrom, and wherein each of the at least one protuberances frictionally engages a corresponding one of the wings.

15. The electrical box assembly of claim 14, wherein the at least one protuberance includes a first protuberance and a second protuberance, wherein the first protuberance and the second protuberance frictionally engage the corresponding one of the wings on opposing sides of the corresponding one of the wings.

16. The electrical box assembly of claim 15, wherein the first protuberance is formed on an inwardly facing surface of a flanged portion of the electrical box and the second protuberance is formed on an outwardly facing surface of the sidewall.

17. The electrical box assembly of claim 14, wherein each of the at least one protuberances includes an arcuate shape.

18. The electrical box assembly of claim 14, wherein at least one end of each of the at least one protuberances is tapered for piloting an end of a corresponding one of the wings therein.

* * * * *